US012767127B2

(12) United States Patent
van Lier et al.

(10) Patent No.: US 12,767,127 B2
(45) Date of Patent: Oct. 20, 2026

(54) METHOD FOR ASSISTING A DRIVER BY MEANS OF A DRIVER ASSISTANCE SYSTEM BY MEANS OF CORRECTED DRIVER SIGNALS FOR A DRIVING DYNAMICS CONTROL SYSTEM

(71) Applicant: Continental Engineering Services GmbH, Frankfurt (DE)

(72) Inventors: Volker van Lier, Frankfurt am Main (DE); Bernd Pithan, Frankfurt am Main (DE); Florian Eitel, Frankfurt am Main (DE)

(73) Assignee: Continental Engineering Services GmbH, Frankfurt (DE)

( * ) Notice: Subject to any disclaimer, the term of this patent is extended or adjusted under 35 U.S.C. 154(b) by 140 days.

(21) Appl. No.: 17/188,435

(22) Filed: Mar. 1, 2021

(65) Prior Publication Data

US 2021/0269026 A1 Sep. 2, 2021

(30) Foreign Application Priority Data

Mar. 2, 2020 (DE) ..................... 10 2020 202 669.6

(51) Int. Cl.
*B60W 30/12* (2020.01)

(52) U.S. Cl.
CPC ......... *B60W 30/12* (2013.01); *B60W 2552/53* (2020.02)

(58) Field of Classification Search
CPC .......................... B60W 30/12; B60W 2552/53
(Continued)

(56) References Cited

U.S. PATENT DOCUMENTS 9,221,466 B2 12/2015 Lich et al.
9,409,554 B2 8/2016 Raste et al.
(Continued)

FOREIGN PATENT DOCUMENTS

CN 105711588 A 6/2016
CN 107150682 A 9/2017
(Continued)

OTHER PUBLICATIONS

The new BMW 5 Series, May 2013, BMW Media Information (Year: 2013).*
(Continued)

*Primary Examiner* — Matthias S Weisfeld
(74) *Attorney, Agent, or Firm* — Buchanan Ingersoll & Rooney PC

(57) ABSTRACT

A method for assisting a driver by a driver assistance system, the driver assistance system evaluating and processing information items input by the driver and/or driver specifications as driver signals in a driver assistance unit and providing corrected driver signals, if the driver assistance unit evaluates a correction boundary condition as being satisfied, the driver assistance unit utilizing the observer signals of an observer unit for the evaluation of the correction boundary condition and for the generation of the corrected driver signals, the observer signals being dependent on the present driving state situation detected by vehicle sensors and/or on at least one information item relating to the course of the driving lane, the corrected driver signals being provided to a driving dynamics control system of the vehicle.

7 Claims, 1 Drawing Sheet

(58) Field of Classification Search
USPC .......................................................... 701/26
See application file for complete search history.

(56) References Cited

U.S. PATENT DOCUMENTS

| | | | | |
|---|---|---|---|---|
| 10,101,742 | B2 | 10/2018 | Prokhorov | |
| 10,275,662 | B1 * | 4/2019 | Askeland | G06V 20/56 |
| 2009/0157263 | A1 * | 6/2009 | Shin | B62D 5/0481 701/43 |
| 2012/0239255 | A1 * | 9/2012 | Kojima | B62D 15/025 701/42 |
| 2013/0289808 | A1 * | 10/2013 | Ross | B60K 6/445 903/930 |
| 2016/0096514 | A1 | 4/2016 | Miller et al. | |
| 2016/0313733 | A1 * | 10/2016 | Bellem | B60N 2/02 |
| 2017/0029025 | A1 * | 2/2017 | Kim | B60W 30/00 |
| 2017/0235305 | A1 | 8/2017 | Jung et al. | |
| 2018/0237007 | A1 | 8/2018 | Adam et al. | |
| 2018/0292822 | A1 * | 10/2018 | Ichikawa | B60W 40/08 |
| 2018/0319402 | A1 * | 11/2018 | Mills | B60W 30/18163 |
| 2019/0248287 | A1 * | 8/2019 | Ono | B60K 35/10 |
| 2019/0291726 | A1 | 9/2019 | Shalev-Shwartz et al. | |
| 2019/0313733 | A1 * | 10/2019 | Bartel | A43B 13/026 |
| 2020/0079308 | A1 * | 3/2020 | Vanterpool | B60R 19/483 |

FOREIGN PATENT DOCUMENTS

| | | | | |
|---|---|---|---|---|
| CN | 107640154 | A | 1/2018 | |
| CN | 108466617 | A | 8/2018 | |
| CN | 109353343 | A | 2/2019 | |
| CN | 109795486 | A | 5/2019 | |
| CN | 110329255 | A | 10/2019 | |
| DE | 102007029909 | A1 | 1/2009 | |
| DE | 102012212616 | A1 | 1/2013 | |
| DE | 102014220715 | A1 * | 4/2016 | B62D 5/0484 |
| DE | 102015120831 | A1 | 6/2016 | |
| DE | 102018220752 | B3 | 3/2020 | |
| EP | 2974943 | A2 | 1/2016 | |
| JP | 2017095089 | A | 6/2017 | |

OTHER PUBLICATIONS

Extended European Search Report for European Application No. 21 159 838.8, dated Jul. 26, 2021, with translation, 11 pages.
Schacher, S, et al., “Konzept für Mentorensysteme—Neuartige Fahrerassistenzsysteme am Beispiel Race Trainer,” Conference Paper—Nov. 2018, Research Gate, 19 pages.
European Examination Report for EP Application No. 21 159 838.8, dated Apr. 6, 2023 with translation, 11 pages.
Chinese Office Action for Chinese Application No. 202110229146.3, dated Dec. 27, 2023 with English translation, 13 pages.
Office Action (The Second Office Action) issued Sep. 23, 2024, by the State Intellectual Property Office of People’s Republic of China in corresponding Chinese Patent Application No. 202110229146.3 and an English machine translation of the Office Action. (27 pages).
Office Action (Decision of Rejection) issued Jan. 21, 2025, by the State Intellectual Property Office of People’s Republic of China in corresponding Chinese Patent Application No. 202110229146.3 and an English machine translation of the Office Action. (21 pages).

* cited by examiner

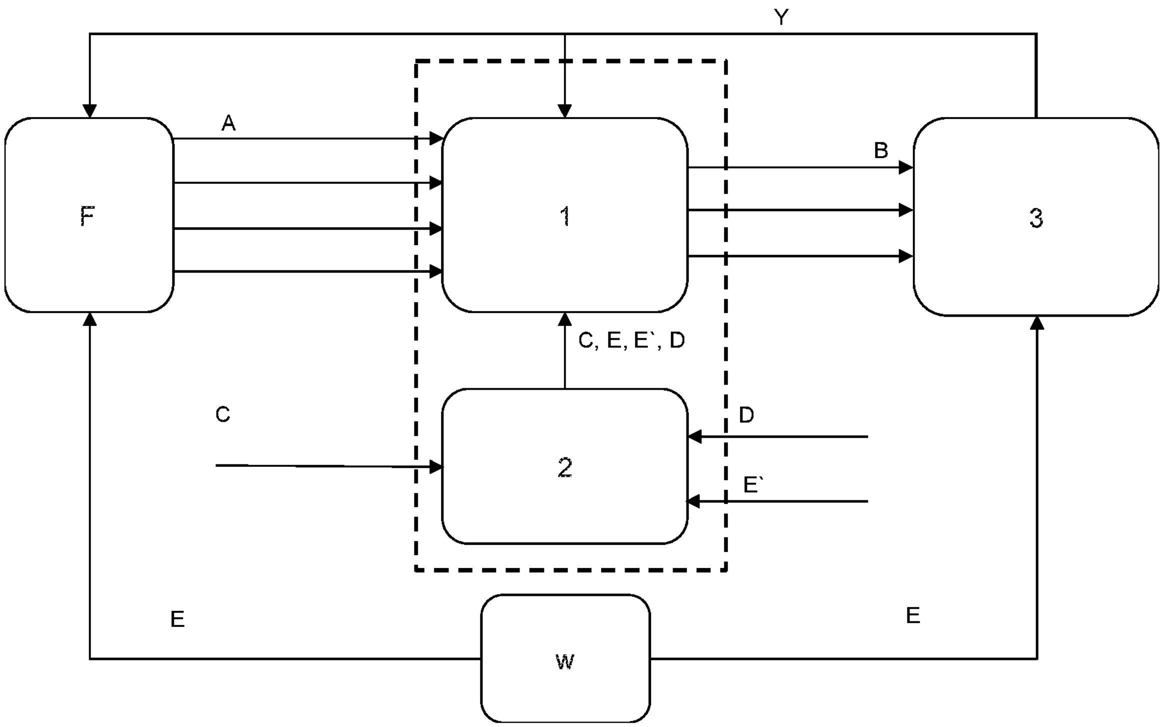
Y
A
F
1
B
3
C, E, E`, D
C
2
D
E`
E
W
E

METHOD FOR ASSISTING A DRIVER BY MEANS OF A DRIVER ASSISTANCE SYSTEM BY MEANS OF CORRECTED DRIVER SIGNALS FOR A DRIVING DYNAMICS CONTROL SYSTEM

CROSS REFERENCE TO RELATED APPLICATIONS

This application claims priority to German Patent Application No. 10 2020 202 669.6, filed Mar. 2, 2020, the contents of such applications being incorporated by reference herein.

FIELD OF THE INVENTION

The invention relates to a method for a driver assistance system, and to the driver assistance system itself.

BACKGROUND OF THE INVENTION

Driving dynamics control systems, such as for example an electronic stability program, are known. These can intervene in the driving dynamics of a vehicle or motor vehicle actively by way of actuators on the basis of sensor information items and in a manner dependent on driver signals which represent the driver demand. Stress, challenging ambient conditions or complex driving tasks can overburden the driver. In this case, the driver demand need not necessarily represent the optimum setpoint value. In this case, the driving dynamics control systems will not be able to implement the optimum measures to ensure in particular the achievable level of driving safety.

SUMMARY OF THE INVENTION

The problem addressed by an aspect of the invention is that of proposing a method and a driver assistance system which improves safety and/or achieves improved driving dynamics control and/or alleviates and/or corrects possible erroneous driver inputs.

A preferred method for assisting a driver by means of a driver assistance system, the driver assistance system evaluating and processing information items input by the driver and/or driver specifications as driver signals in a driver assistance unit and providing corrected driver signals, if the driver assistance unit evaluates a correction boundary condition as being satisfied, the driver assistance unit utilizing the observer signals of an observer unit for the evaluation of the correction boundary condition and for the generation of the corrected driver signals, the observer signals being dependent on the present driving state situation detected by vehicle sensors, in particular one or more vehicle sensors of an ESP or electronic stability program, and/or on an information item relating to the course of the driving lane, which is obtained in particular from position data and map data, the corrected driver signals being provided to a driving dynamics control system of the vehicle.

An information item relating to the course of the driving lane is expediently understood to mean a geometry and/or the typology and/or the roadway condition or roadway characteristics, in particular the friction coefficient of the roadway surface, of the driving lane, in particular with regard to the course of the driving lane that lies ahead of the vehicle in a driving direction of the vehicle, particularly preferably within a defined distance interval from the vehicle.

The correction boundary condition is preferably understood to mean the information item or condition relating to whether the driver demand trajectory of the vehicle, based on the driver signals, would lead to a departure from the driving lane and/or a crossing of the driving lane boundary by the vehicle and/or whether the vehicle would enter a defined/potentially hazardous driving situation, for example if the driver demand trajectory would, in combination with a defined minimum speed of the vehicle, strike an obstacle.

The check of the correction boundary conditions is performed preferably in the driver assistance unit, or alternatively preferably in the observer unit.

Preferably, the driver signals include the steering angle/a steering angle information item, in particular provided by a steering angle sensor, and/or a steering moment/a steering moment information item, in particular provided by a steering moment sensor, and/or an accelerator pedal position information item, in particular provided by an accelerator pedal travel/angle sensor, and/or a brake pedal position information item, in particular provided by a brake pedal travel/angle sensor, and/or an information item relating to whether the driver assistance system is active. The information item relating to whether the driver assistance system is active takes into consideration in particular whether the driver assistance system has been manually activated or deactivated by the driver and/or whether it has been automatically activated by a driving dynamics situation.

The corrected driver signals expediently comprise signals/information items adapted and/or modified and/or corrected by the driver assistance unit, in particular including a corrected steering angle/a corrected steering angle information item and/or a corrected steering moment/a corrected steering moment information item and/or a corrected accelerator pedal position information item and/or a corrected brake pedal position information item. These corrected information items or corrected driver signals are in particular adapted, or calculated by the driver assistance unit, such that the driving dynamics control system, an effect of the driving dynamics control to be achieved by said system are optimized, and particularly preferably detects and provides, by means of the driver signals, corrects possible undesired driver interventions or driver interventions which, in particular significantly, impair the driving dynamics and/or vehicle safety. For example, such driver interventions which significantly impair the driving dynamics and/or the vehicle safety may be caused by hectic/panicked driver interventions in extreme driving dynamics situations. Here, the vehicle safety may particularly preferably be assessed with regard to a departure from the roadway and/or the corresponding trajectory in combination with the vehicle speed.

A driving dynamics control system is preferably understood to mean an anti-lock system and/or a traction slip system and/or an electronic stability program or ESP and/or a driver assistance system such as for example an emergency braking assistance system and/or an adaptive cruise control system and/or a lane-keeping and/or lane-change assistance system. In particular, the driving dynamics control system is designed so as to perform an active or automatic driving dynamics intervention, expediently on the basis of the driver signals and of observation signals.

It is preferred that the observer unit has and/or is provided with map data and/or navigation data relating to the course of the driving lane, and that a GPS position of the vehicle is provided to the observer unit, with additionally in particular at least one roadway property information item being provided from an additional sensor and/or evaluation unit and/or from a network service.

It is expedient that, from the data and information items of the observer unit, the driver assistance unit calculates a driving lane boundary model and/or a course of a driving lane edge, and, in the course of the assessment of the correction boundary condition, checks whether the driver demand trajectory of the vehicle presently determined by the driver by means of the driver signals would lead to a departure from the driving lane and/or a crossing of the driving lane boundary, if this is the case, the correction boundary condition is present and the driver assistance unit calculates/generates corrected driver signals, and if the correction boundary condition is not present, no corrected driver signals are calculated/generated, but the original driver signals are provided to the driving dynamics control system.

The corrected driver signals are preferably calculated/generated in the driver assistance unit such that the present trajectory of the vehicle points substantially to the center of the driving lane or to a central driving lane strip, and here, in particular, the driving dynamics control system keeps the vehicle substantially on the driving lane by means of the corrected driver signals.

It is preferred that the driver assistance system is designed such that the driver assistance unit can be deactivated, in particular at any time, by means of a defined driver override input. The driver override input can particularly preferably be input by means of the actuation of a button.

It is preferred that the check of the correction boundary condition in the driver assistance unit is performed cyclically and/or continuously, and, if the driver signals a defined number of cycles or a defined period of time and/or after an intervention of the driving dynamics control system on the basis of corrected driver signals, the driver causes driver signals which satisfy the correction boundary condition that the driver assistance unit is then deactivated.

The driver assistance unit is preferably designed such that it is first activated above a defined minimum speed, for example above 15 km/h.

The driving dynamics control system is expediently designed so as to evaluate at least the speed in a direction of travel by means of a respective wheel rotation speed sensor at each wheel and/or evaluate a lateral acceleration by means of a lateral acceleration sensor and/or evaluate a yaw rate about the vehicle vertical axis by means of a rate-of-rotation sensor and/or evaluate the steering input by the driver by means of a steering angle sensor. Here, the driving dynamics control system preferably actuates the brake of each wheel or is capable of doing so and adjusts the yaw angle of the vehicle by closed-loop control.

It is preferable that the driver assistance system with its constituent parts is configured as a software program product which is executed on one or more electronic control units, in particular in a distributed manner.

The driver assistance unit is preferably active only when all of the following conditions or requirements are met:

- no deactivation or driver override input by the driver,
- availability of the data of the vehicle position and orientation,
- availability of data regarding the course of the road and/or the destination,
- availability of information relating to ambient conditions around the vehicle, such as for example friction coefficient and condition of the roadway surface,
- the sensor information items commonly available for ESC systems,
- available actuators and control systems of the driving dynamics control system.

The driver signals preferably comprise the following input information items of the driver and/or driver specifications: steering wheel input or steering angle, accelerator pedal or throttle pedal position, brake pedal position and in particular a possible separate activation of the driver assistance unit.

REFERENCE DESIGNATIONS

- 1 Driver assistance unit
- 2 Observer unit
- 3 Driving dynamics control system
- A Driver signals
- B Corrected driver signals
- C Map data and navigation data relating to the course of the driving lane
- D GPS position
- E Roadway property information
- F Driver
- W Road
- Y Driving dynamics

BRIEF DESCRIPTION OF THE DRAWINGS

The FIGURE shows elements of the method and of the driver assistance system by way of example and schematically.

DETAILED DESCRIPTION OF THE PREFERRED EMBODIMENTS

The driver F specifies driver signals A, which are normally used for the driving dynamics control system 3. Said driver signals A include for example the steering angle and/or a steering moment and/or an accelerator pedal position information item and/or a brake pedal position information item and/or an information item relating to whether the driver assistance system is active. Said driver signals are then evaluated in the driver assistance unit 1 by means of the observer unit B which, in the example, evaluates map data and/or navigation data C relating to the course of the driving lane, a GPS position of the vehicle and additionally a roadway property information item for an evaluation of a correction boundary condition. The driver assistance unit 1 evaluates whether a correction boundary condition is satisfied and, if the correction boundary condition is satisfied, generates or calculates corrected driver signals A and provides these to the driving dynamics control system 3. In the example, the observer unit 1 takes into consideration a roadway property or roadway property information item E relating to the road W as detected by means of at least one sensor and additionally a roadway property information item provided from a network service E'.

From the data and information items C, D, E of the observer unit 2, the driver assistance unit 1 calculates a driving lane boundary model and/or a course of a driving lane edge, and, in the course of the assessment of the correction boundary condition, checks whether the driver demand trajectory of the vehicle presently determined by the driver F by means of the driver signals A would lead to a departure from the driving lane or a crossing of the driving lane boundary, if this is the case, the correction boundary condition is present and the driver assistance unit 1 calculates corrected driver signals B, and if the correction boundary condition is not present, no corrected driver signals B are calculated, but the original driver signals A are provided to the driving dynamics control system 3.

In the example, the units 1 and 2 bordered by dashed lines form the driver assistance system.

Y indicates the effect or influence of the respective signals of the units on the driving dynamics Y of the vehicle in its surroundings.

The invention claimed is:

1. A method for assisting a driver by a driver assistance system, the method comprising:

evaluating, by the driver assistance system, information items input by the driver and/or driver specifications as driver signals in a driver assistance unit, wherein the driver signals include at least one of steering wheel input or steering angle, accelerator pedal or throttle pedal position or brake pedal position, and a separate activation of the driver assistance unit;

evaluating by the driver assistance unit, whether a correction boundary condition is satisfied by utilizing observer signals of an observer unit for the evaluation of the correction boundary condition, the correction boundary condition being departure from a course of a driving lane, the observer signals being dependent on the present driving state situation detected by vehicle sensors and/or on at least one information item relating to the course of the driving lane;

automatically generating corrected driver signals and directly providing the corrected driver signals to a driving dynamics control system of the vehicle in response to the correction boundary condition being satisfied;

performing the evaluating of the correction boundary condition in the driver assistance unit cyclically and/or continuously;

and if the correction boundary condition is not present, providing the driver signals to the driving dynamics control system, without generating corrected driver signals, wherein the driver assistance unit is activated when all of the following conditions or requirements are met:

availability of data regarding a position and an orientation of the vehicle, availability of data regarding a course of a road and/or a destination, availability of information relating to ambient conditions around the vehicle, the ambient conditions including one or more of a friction coefficient of a roadway surface and a condition of the roadway surface, availability of sensor information for Electronic Stability Control (ESC) systems, and availability of actuators and control systems of the driving dynamics control system, and wherein the driver assistance unit is deactivated:

at any time, by a defined driver override input, or when any one of the following conditions or requirements is not met:

availability of the data regarding the position and the orientation of the vehicle, availability of the data regarding the course of the road and/or the destination, availability of the information relating to the ambient conditions around the vehicle, availability of the sensor information for the ESC systems, and availability of the actuators and the control systems of the driving dynamics control system.

2. The method as claimed in claim 1, wherein the observer unit has and/or is provided with map data and/or navigation data relating to the course of the driving lane, and wherein a GPS position of the vehicle is provided to the observer unit, with at least one roadway property information item being provided from an additional sensor, an evaluation unit, and/or from a network service.

3. The method as claimed in claim 2, wherein, from the data and information items of the observer unit, the driver assistance unit calculates a driving lane boundary model and/or a course of a driving lane edge, and, in the course of the assessment of the correction boundary condition, checks whether the driver demand trajectory of the vehicle presently determined by the driver signals would lead to a departure from the driving lane and/or a crossing of the driving lane boundary, if this is the case, the correction boundary condition is present and the driver assistance unit calculates/generates corrected driver signals, and if the correction boundary condition is not present, no corrected driver signals are calculated/generated, but the original driver signals are provided to the driving dynamics control system.

4. The method as claimed in claim 3, wherein the corrected driver signals are calculated/generated in the driver assistance unit such that the present trajectory of the vehicle points substantially to a center of the driving lane or to a central driving lane strip, and the driving dynamics control system keeps the vehicle on the driving lane by the corrected driver signals.

5. A driver assistance system, for carrying out a method as claimed in claim 1, comprising a driver assistance unit which evaluates and processes information items input by a driver and/or driver specifications as driver signals and provides corrected driver signals, if the driver assistance unit evaluates a correction boundary condition as being satisfied, the driver assistance unit utilizing the observer signals of an observer unit for the evaluation of the correction boundary condition and for the generation of the corrected driver signals, the observer signals being dependent on the present driving state situation detected by vehicle sensors and on an information item relating to the course of the driving lane, the corrected driver signals being provided to a driving dynamics control system of the vehicle.

6. The method as claimed in claim 1, wherein the driver assistance unit is first activated above a defined minimum speed of the vehicle of 15 km/h.

7. The method as claimed in claim 1, further comprising deactivating the driver assistance unit when the driver signals, including the separate activation of the driver assistance unit, have a defined number of a plurality of cycles.

* * * * *